US006519589B2

(12) United States Patent
Mann et al.

(10) Patent No.: US 6,519,589 B2
(45) Date of Patent: *Feb. 11, 2003

(54) SYSTEM AND METHOD FOR GENERATING DOMAIN NAMES AND FOR FACILITATING REGISTRATION AND TRANSFER OF THE SAME

(75) Inventors: Michael Mann, Bethesda, MD (US); Ronald Fitzherbert, Austin, TX (US)

(73) Assignee: RareDomains.com, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/902,114

(22) Filed: Jul. 10, 2001

(65) Prior Publication Data

US 2001/0039543 A1 Nov. 8, 2001

Related U.S. Application Data

(63) Continuation of application No. 09/400,602, filed on Sep. 22, 1999, now Pat. No. 6,298,341.

(51) Int. Cl.[7] .............................................. G06F 17/30

(52) U.S. Cl. ............................. 707/3; 705/59; 709/228

(58) Field of Search ............................ 707/3; 709/228; 705/59

(56) References Cited

U.S. PATENT DOCUMENTS

| | | | | |
|---|---|---|---|---|
| 5,777,989 | A | | 7/1998 | McGarvey ................... 370/254 |
| 5,884,246 | A | | 3/1999 | Boucher et al. ................ 704/2 |
| 5,974,453 | A | | 10/1999 | Andersen et al. ............ 709/220 |
| 6,085,321 | A | | 7/2000 | Gibbs et al. ................. 713/170 |
| 6,298,341 | B1 | * | 10/2001 | Mann et al. .................... 707/3 |

OTHER PUBLICATIONS

Woods, Bob, "Zapata Starts Moving Toward the Net, Again," Newsbytes, Mar. 19, 1999.
"Network Solutions' Affiliate Program to Offer Expanded Internet Identity Services Through Storefront," Business Wire, pp. 1300, May 11, 2000.
"Network Solutions Upgrades Domain Name Registration Services," http://www.nsol.com/news/2000/pr_20000509b.html, printed on Jul. 13, 2000.
Oppenheimer, Judith, "What Will NSI Do Next . . . ?," The Ultimate Domain Name With Domain News, http://www-.domainnotes.com/news/article/1,2160,3371_363861, 00.html, printed on Jul. 13, 2000.
Lake, Matt, "Take Your Pick of Domain Registrars," PC World.com, May 16, 2000.
"Domain Name Service, NameBoy, Launches Version 2.0; Naming Engine Now Suggests Terms, Enables Users to Track and Send Searches," Business Wire, pp. 174, May 3, 2000.

(List continued on next page.)

Primary Examiner—Charles Rones
(74) Attorney, Agent, or Firm—Erik B. Cherdak; Septoe & Johnson LLP

(57) ABSTRACT

New and improved systems and methods for generating and facilitating registration and transfer of available domain names. The systems and methods include and involve a data storage facility for storing at least one adjunct term for use in generating at least one registerable domain name, and a processor arrangement which is coupled to the data storage facility and which is configured to be accessed by a user system via an electronic data network, to receive at least one root term from the user system, to concatenate at least one root term with at least one adjunct term to generate at least one candidate domain name, to query a data source to determine if the candidate domain name(s) is available for registration and/or transfer, and to notify the user system of the candidate domain name(s) when the same are available for registration and/or transfer.

4 Claims, 11 Drawing Sheets

OTHER PUBLICATIONS

Carter, David, "Trading in Domain Names," http://www.netgain.co.nz/library/what_domains.htm, printed on Jul. 13, 2000.

"Domain Utilities Library," Domain Shoppers Guide Domain Utilities Software Shoppers Guide, wsiwyg:/246/ http://www.domainshoppersguide.com/utilities, printed on Jul. 13, 2000.

Tedeschi, Michael, "WWW.landrush.com Bethesda Based Cyber–Real Estate Mogul Michael Mann May Already Own Your Dream Web Address," Washington Business Forward, Feb. 2000.

"NETrageous SITEing of the Week: Whois.net," NETrageous SITEings, Issue #20, Oct. 5, 1997, www.netrageous-results.com/siteings20.html, p. 1.

"Free Service Helps E–Buisnesses Uncover Distinguished Domain Names Fast," PRNewswire, Oct. 25, 1999.

Woods, Bob, "Amazon.com Sues Alleged Cybersquatter in Greece," Newsbytes, Aug. 18, 1999.

Printout of an Internet/World Wide Web site view retrieved from: https://register.worldnic.com/servlet/nsi.regplus.main.UpdateDomainList dated Jan. 19, 1998.

* cited by examiner

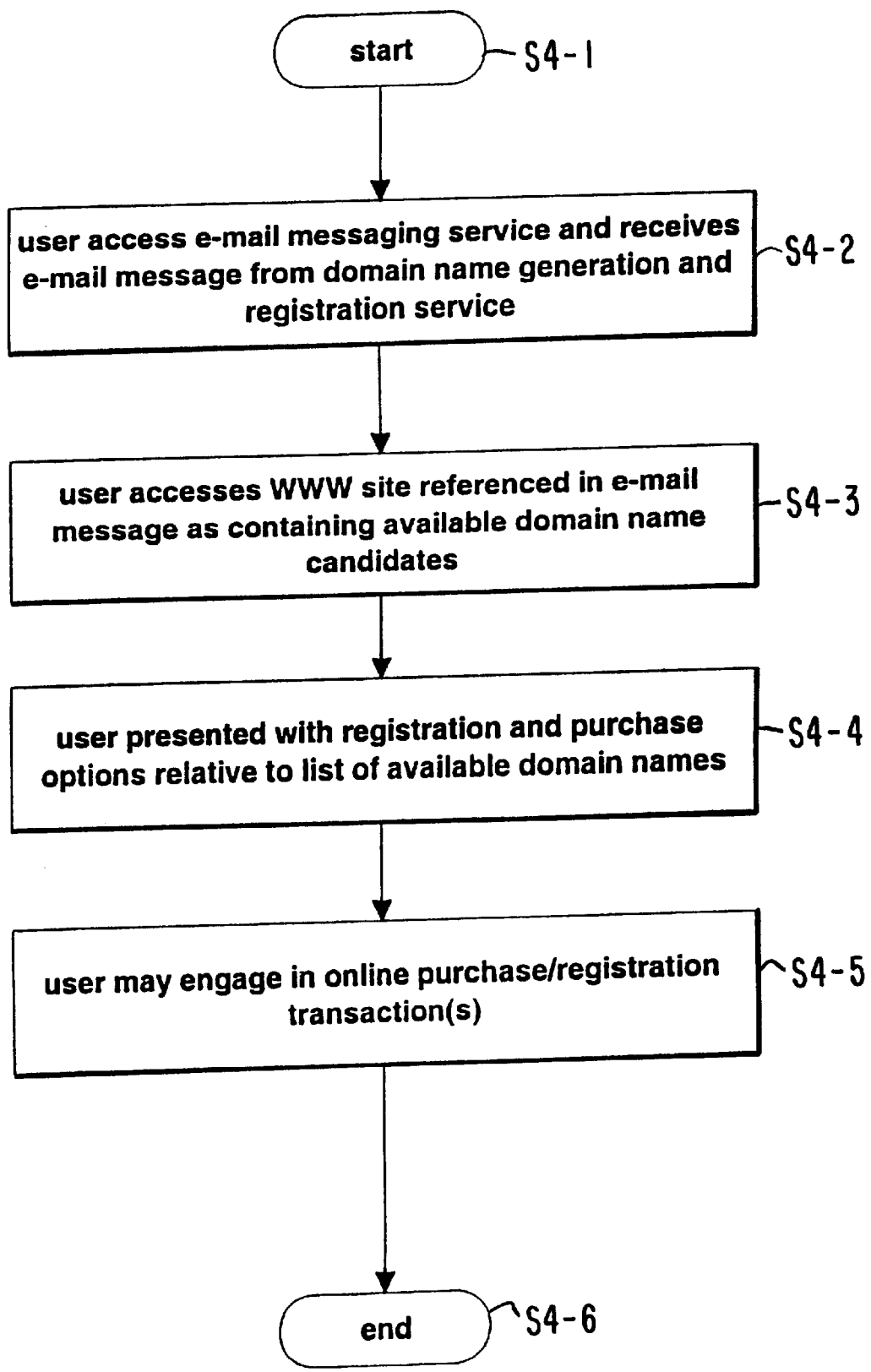

FIG. 5C

EMAIL TO: erik@ctpatents.com

To view your results, point your web browser at:

http://www.whoisplus.com/cgi-bin/results.cgi?BD0909125340705

Please recognize that 6 million domain names are already owned by others. Therefore, to acquire the very best names you will likely need to buy from a secondary market like BuyDomains.com. However, your WhoisPlus results will contain among the best available names that include the keywords you have specified. Many of the words will be nonsensical by default but among the results you will often find at least one name that is ideal for your e-business activities. Since many of the technical factors in a thorough domain search are out of our control we are unable to guarantee the results - although they are generally highly accurate. Good luck in your hunt.

510

US 6,519,589 B2

SYSTEM AND METHOD FOR GENERATING DOMAIN NAMES AND FOR FACILITATING REGISTRATION AND TRANSFER OF THE SAME

RELATED APPLICATION INFORMATION

The present application is a continuation application of application Ser. No. 09/400,602 filed Sep. 22, 1999 now U.S. Pat. No. 6,298,341, issued Oct. 2, 2001, by the U.S. Patent and Tradmark Office.

BACKGROUND OF THE INVENTION

1. Field of the Invention

The present invention relates to systems and methods used to facilitate registration and transfer of domain names and uniform resource locators (URLs) such as those used to access content via the Internet and world wide web (WWW).

2. Description of the Related Art

Registration, transfer, and use of domain names and uniform resource locators (URL) such as those utilized to access content via electronic data network such as the Internet and WWW are well known. Network users utilize domain names (e.g., "microsoft.com," etc.) in place of numeric sequences (i.e., Internet Protocol (IP) addresses such as 255.12.10.112, for example) which are difficult to remember and use. Typically, domain names consist of a root name or cipher followed by a period (pronounced "dot") which is then followed by what has been referred to as a "top level domain" indicator (e.g., ".com", ".org", ".gov", ".net", ".cc", and other domains such as country codes, etc.). Top level domain indicators are used to logically separate or distinguish content sources (e.g., commercial ".com" sources versus governmental ".gov" sources). Many domain names have been registered and transferred which correspond to famous trademarks such as "ge.com" so that consumers can access online content about products and services from well known providers (e.g., General Electric, etc.).

Domain names function as a result of their uniqueness relative to numeric network addresses. That is, a particular domain name must correspond to a single content source, thus necessitating the registration of many different domain names. As such, domain names have been registered (and transferred) at an astounding rate. In fact, Network Solutions, Inc. reports that over five (5) million WWW addresses have been registered in the last five years.

Prior to use, a proposed domain name must be registered (or otherwise obtained) with a domain name registrar such as Network Solutions, Inc. (www.networksolutions.com). Once registered, a domain name may be used to point to a particular content source (e.g., a WWW page, etc.) residing on a designated server system (e.g., a WWW server). Typically, the mapping of a domain name (e.g., "ge.com," etc.) is carried out by a domain name server system such as a public Internet domain name server system (DNS system) maintained by Network Solutions, Inc. and the registration database authority known as InterNIC (www.InterNIC.net).

Registration usually involves some sort of manual input of a root name (i.e., the character string prior to the period) and the selection of a top level domain name. See, for example, the www.networksolutions.com homepage. Upon executing a script, a registration service typically checks one or more databases to determine if a domain name is available for registration. If registration is available, a service will permit a user to complete an online form to perfect registration. If registration is not available, a service may suggest alternate domain names which include the same root term (i.e., the term before the period) concatenated with an alternate top level domain name. Unfortunately, domain name registration services do not function to suggest alternate domain names which may include terms not originally selected by a network user or content provider. As a result, a network user is often left to laboriously, exhaustively, and manually enter many potential domain names which ultimately may not be available for registration.

As such, many domain names have been registered by sellers and brokers as assets which may be sold for more than typical registration fees. In fact, the domain name sale and brokerage industry has become a significant source of Internet related commerce. Many providers have paid large sums of money to transfer, acquire and use domain names to point to their content sources. One such seller of domain names is www.raredomains.com which specializes in the sale of unique and valuable domain names. Despite the development of the domain name sale and brokerage industry, content providers are still left to either laboriously try to select an available domain name or select an already registered domain name from a broker that may not be best suited for a particular content delivery service, etc.

As such, there exists no convenient and efficient way for content providers to select, buy, and/or register domain names that best suit their particular purposes. Thus, there exists a need to provide new and improved systems and processes to automate domain name selection and registration and/or transfer processes. To be viable, such new and improved systems and methods must permit network users and content providers to enter suggested terms which may form the basis of potential domain names beyond mere top level domain alternatives which are in fact available for registration, transfer and use.

The present invention addresses the aforementioned problems and needs squarely and provides new and improved systems and methods as described below.

SUMMARY OF THE INVENTION

The present invention solves the aforementioned problems and provides new and improved systems and methods that facilitate generation, registration, and/or transfer of available domain names.

To achieve the benefits provided by the present invention as described in detail below, defined are new and improved systems and methods for generating and facilitating registration of available domain names. The systems and methods include and involve a data storage facility for storing at least one adjunct term for use in generating at least one registerable and/or transferable domain name, and a processor arrangement which is coupled to the data storage facility and which is configured to be accessed by a user system via an electronic data network, to receive at least one root term from the user system, to concatenate at least one root term with at least one adjunct term to generate at least one candidate domain name, to query a data source to determine if the candidate domain name(s) is available for registration and/or transfer, and to notify the user system of the candidate domain name(s) when the same are available for registration and/or transfer.

BRIEF DESCRIPTION OF THE DRAWINGS FIGURES

The present invention is described in detail below with reference to the attached drawing figures, of which:

FIG. 4 is a flowchart that illustrates the processes which are carried out in accordance with a preferred embodiment of the present invention to facilitate receipt of at least one available domain name generated in accordance with the present invention, and registration/transfer of the same;

FIG. 5C is an exemplary electronic mail message that was sent via the Internet to notify a user of at least one available domain name that was generated in accordance with the present invention.

DETAILED DESCRIPTION OF THE PREFERRED EMBODIMENTS

Figure 1:
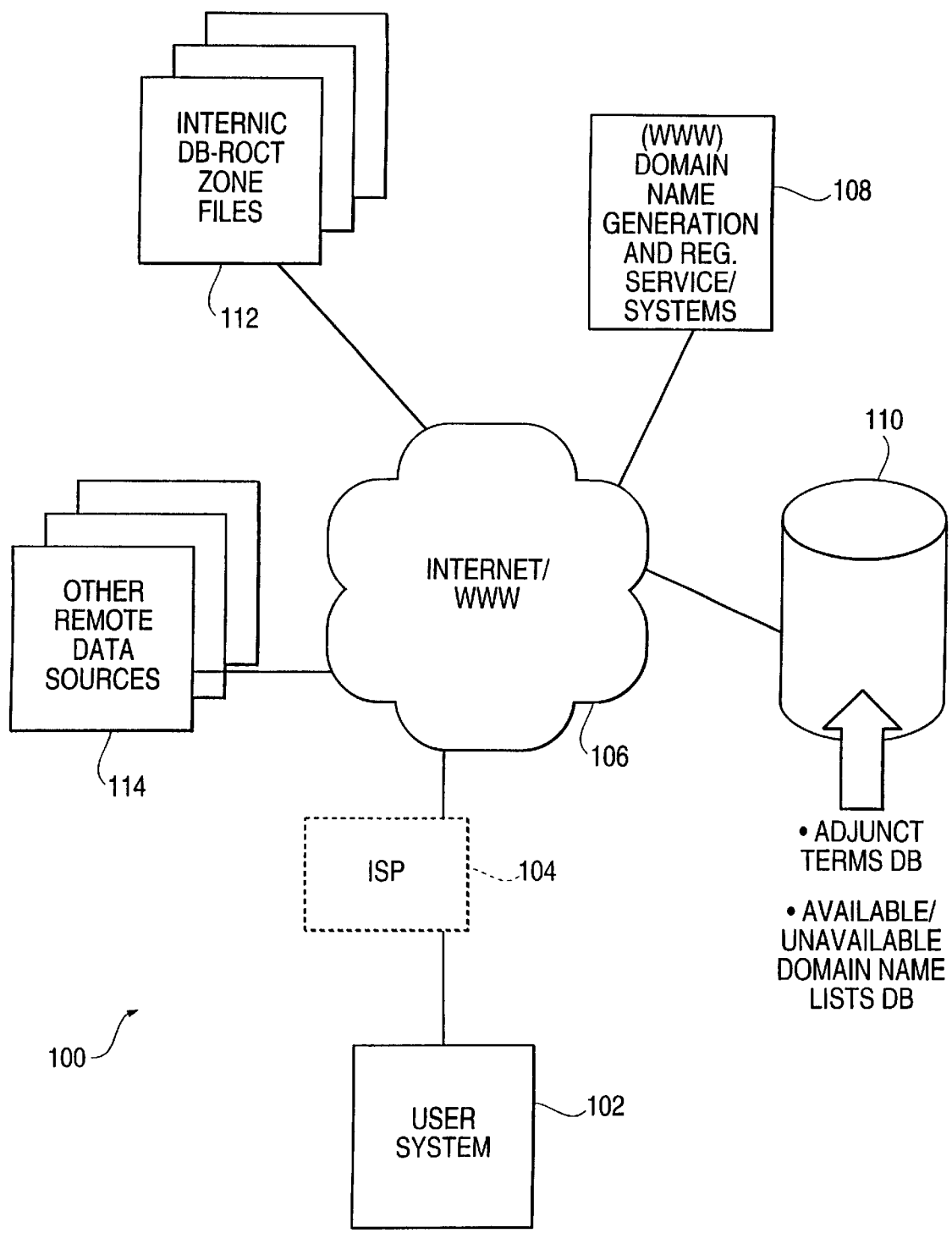
FIG. 1 is a diagram of a system in which domain names and, in particular, those involving the concatenation of user-specified root terms with pre-defined adjunct terms are automatically generated and, possibly, registered and/or transferred according to a preferred embodiment of the present invention.

The present invention is now discussed in detail with regard to the attached drawing figures which were briefly described above. Unless otherwise indicated, like parts and processes are referred to with like reference numerals.

Referring to FIG. 1, depicted therein is a system in which users may access a domain name service and system and receive lists of available candidate domain names based upon user-specified criteria (root terms) in accordance with a preferred embodiment of the present invention. In particular, system 100 includes a user system 102 (e.g., a personal computing system or environment capable of engaging in WWW related communications via an electronic data network, etc.), an Internet Service Provider (ISP) 104, the Internet and world wide web (WWW) 106, a domain name service and system 108, and data store 110 for storing adjunct terms and, possibly, available domain name lists, InterNIC and/or other remote database systems 114 such as Internet root zone files and other databases containing domain name information.

Domain name service and systems 108 preferably is configured as a web server system that is capable of serving web content in the form of web pages to users such as a user who operates user system 102.

Figure 2:
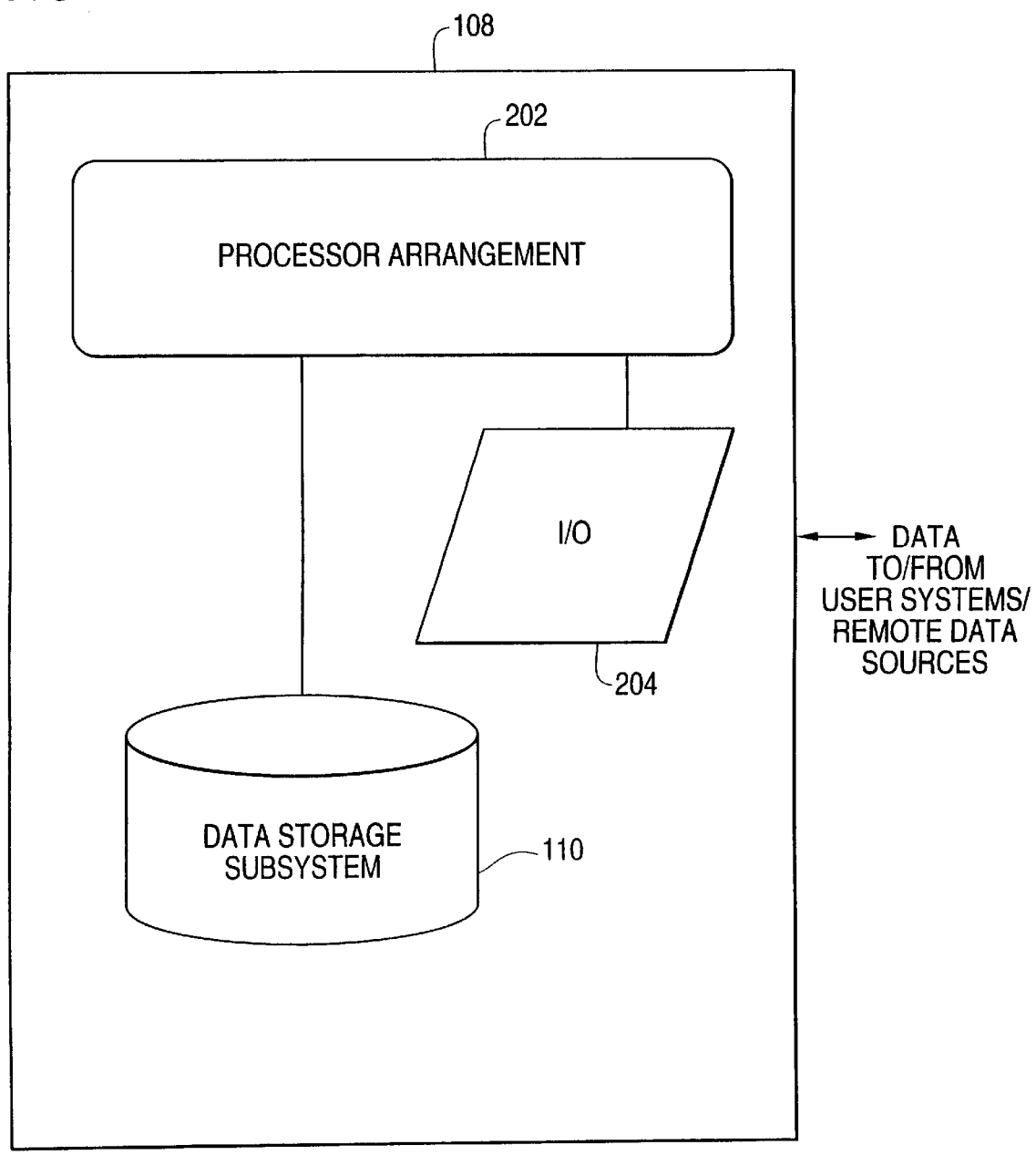
FIG. 2 is a block diagram of the registration server system (e.g., the automatic data processing configured as a programmed WWW server system) shown in FIG. 1.

Referring now to FIG. 2, depicted therein is a block diagram of domain name service and system 108. In particular, domain name service and system 108 includes a processor arrangement 202, data storage subsystem 110 (as shown in FIG. 1) and I/O facilities 204. Data storage subsystem 110 may be logically or physically separated from domain name service and system 108 as shown in FIG., 1. Domain name service and system 108 is configured as a web server system that serves content in the form of web pages to a user system such as user system 102 (FIG. 1). Additionally, domain registration service and system 108 may transmit data to and receive data from remote data sources such as InterNIC database root zone files 112 and/or other remote database services and sources 114. The structure and arrangement of domain registration service and system 108 will be immediately understood to those skilled in the art of modern networking technologies.

The structural aspects of the present invention as shown in FIGS. 1 and 2 are designed to operate together to facilitate generation, registration, and/or transfer of available domain names in accordance with user-specified criteria such as user-specified root terms or names which are automatically concatenated with pre-defined (adjunct) terms in accordance with the present invention. The processes to carryout such functionality are illustrated in a flowchart found in FIGS. 3A, 3B, 3C, and 3D, to which reference is now made.

Figure 3A:
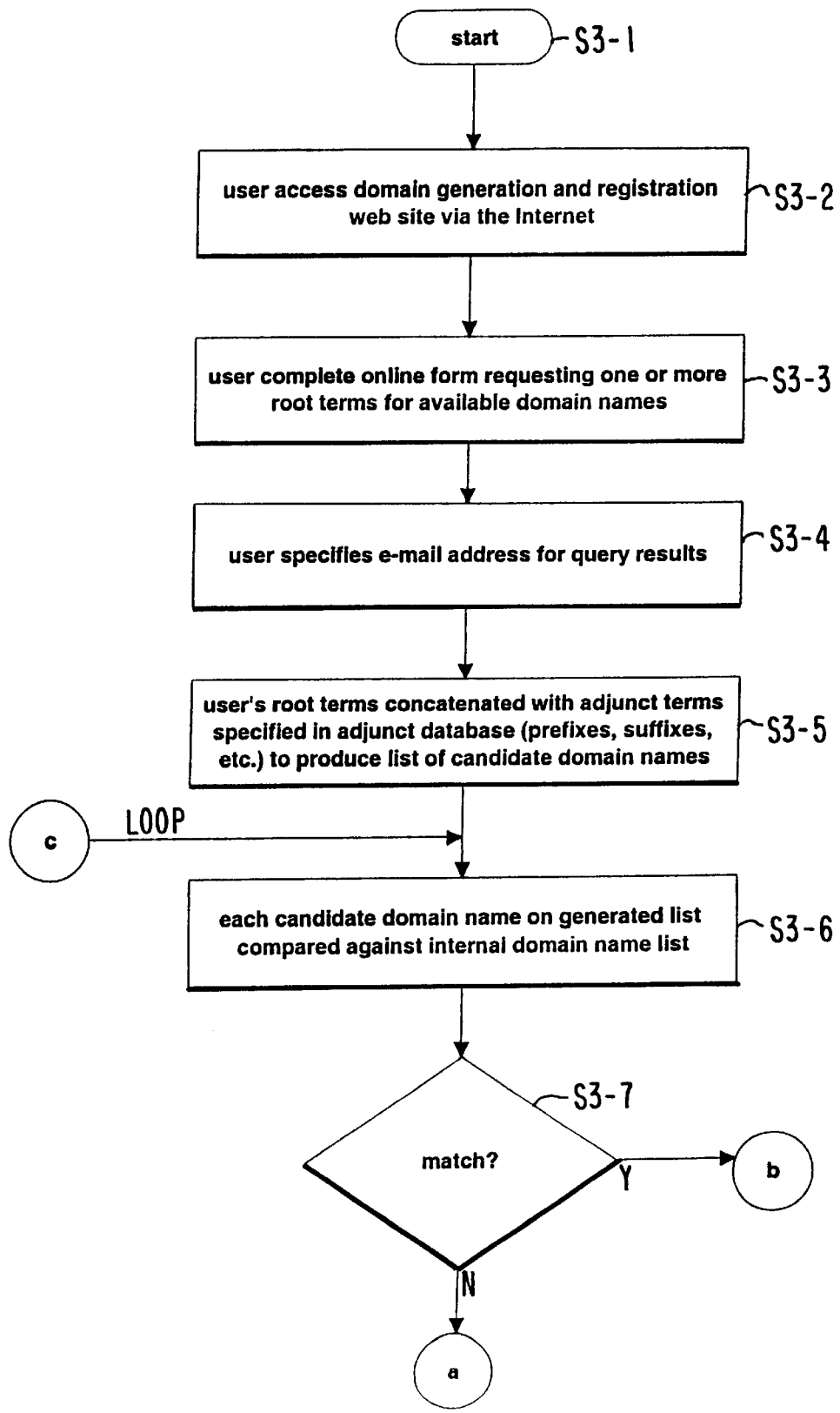
FIG. 3A is flowchart that illustrates the processes which are carried out in accordance with a preferred embodiment of the present invention to automatically generate, register and/or transfer available domain names in accordance with a preferred embodiment of the present invention.
Figure 3B:
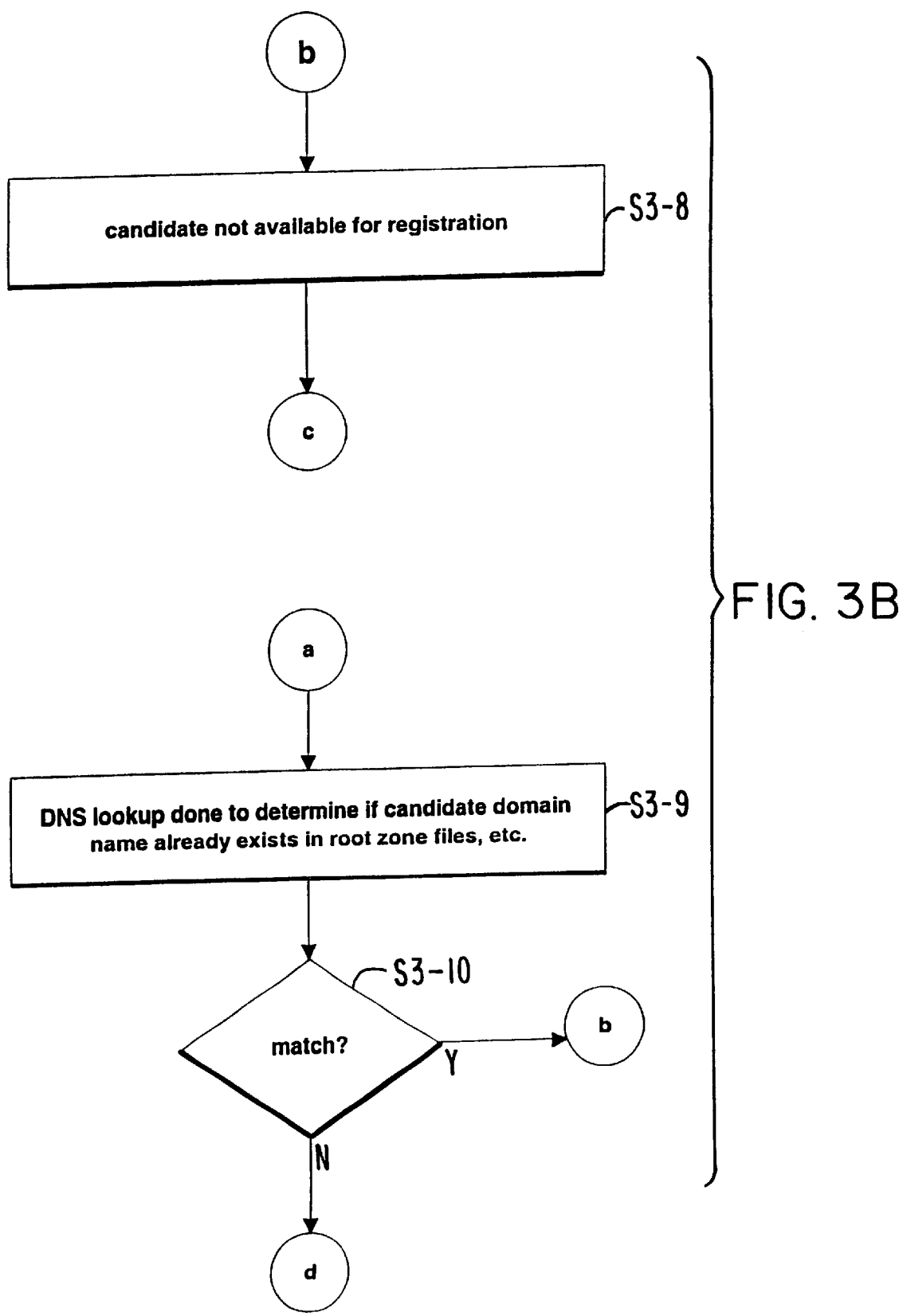
FIG. 3B is a continuation flowchart of the flowchart started in FIG. 3A.
Figure 3C:
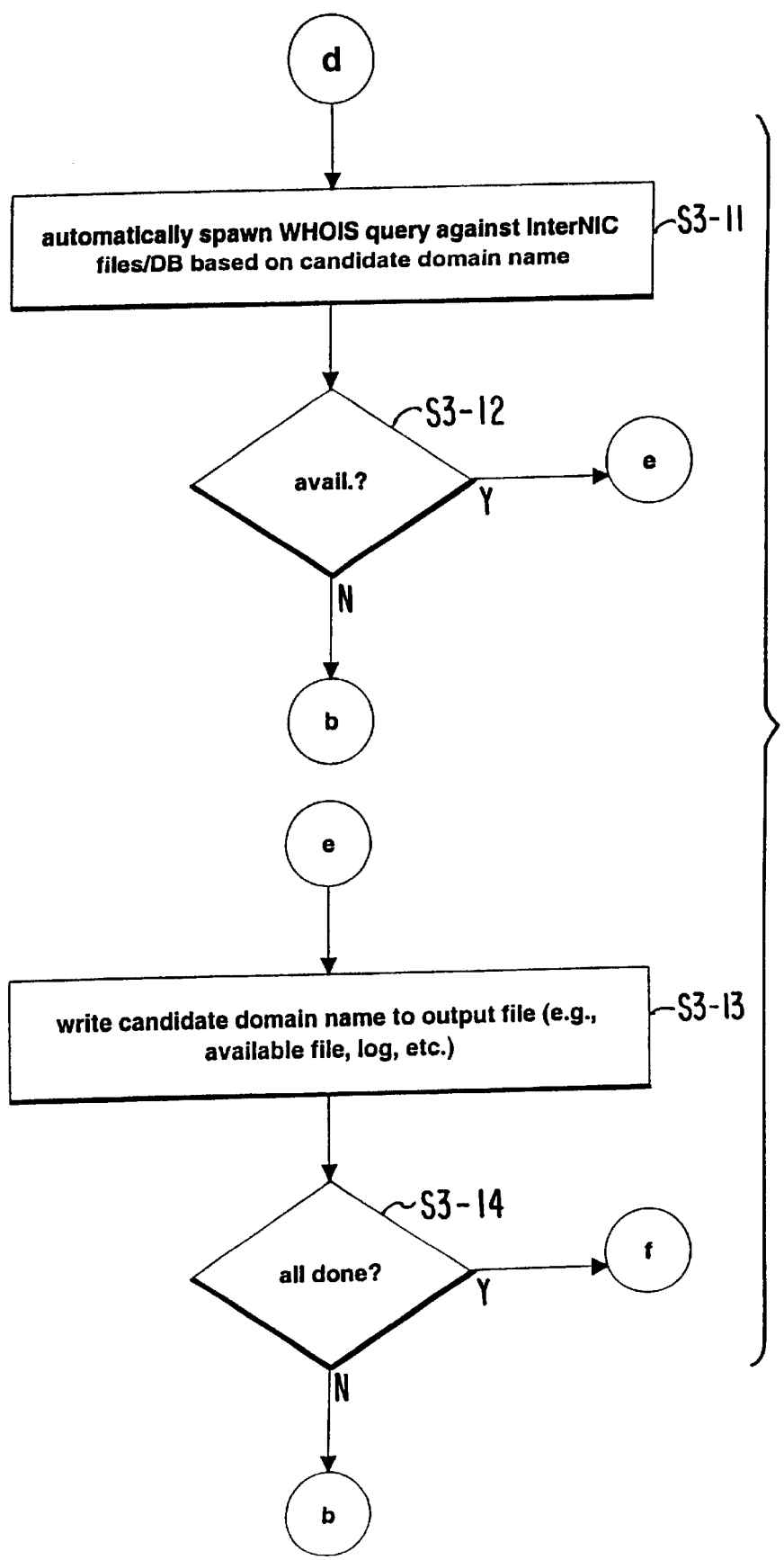
FIG. 3C is a continuation flowchart of the flowchart started in FIGS. 3A and 3B.
Figure 3D:
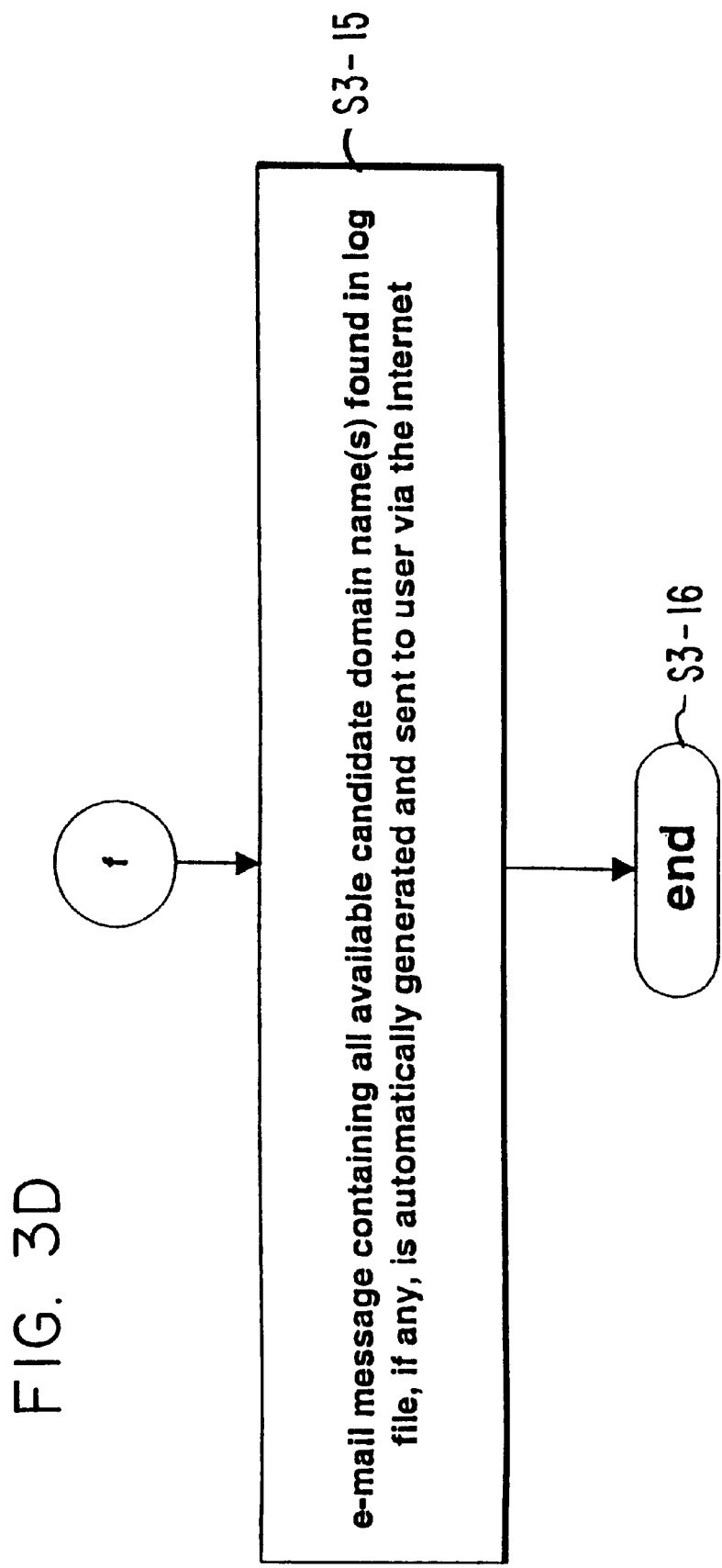
FIG. 3D is the conclusion of the flowchart started in FIGS. 3A, 3B, and 3C.

Referring now to FIG. 3A, depicted therein is the start of a flowchart that illustrates the operations and processes that are carried out within the context of the present invention to permit a user to receive an automatically generated list of available domain names based on user-specified criteria. In particular, processing starts as step S3-1 and immediately proceeds to step S3-2.

At step S3-2, a user accesses a domain name generation, registration, and transfer web site via the internet (e.g., via a WWW browser application, etc.).

Next, at step S3-3, the user completes an online form requesting one or more root terms for available domain names. Such root terms will be used by the domain name registration/transfer web site to generate domain names and to check their availability against lists and databases of already registered domain names. Such root terms are words specified by a user and will ultimately form part of one or more domain names—e.g., if the root term is "tax," generated domain names may be "moneytax.com/.net," "taxmoney.com," "ustax.com," "taxtime.net," etc.

The use of the term "root" is merely meant to describe user specified terms and has no other meaning. That is, the present invention may be configured to accept a user's terms as terms to be concatenated in any way to pre-determined terms (e.g., adjunct terms) found in a database and, for example, as leading and trailing terms. Accordingly, any use of the term "root" to describe user-specified term(s) is not intended to limit the present invention in any way.

Next, at step S3-4, the user specifies an e-mail address for query results to be sent to. That is, lists of available domain names and other correspondence from domain name generation and registration may be sent in accordance with the present invention via electronic mail, web delivery, etc. There is no requirement that e-mail be used as the sole source of results-oriented notification.

Next, at step S3-5, the user's root term(s) are concatenated with adjunct terms specified in an adjunct data base (prefixes, suffixes, etc.) to provide a list of candidate domain names. It is important to note that the concatenation of a user's root term to terms maintained within an adjunct term data base, in accordance with the present invention, may be carried out in accordance with many different concatenation rules. For example, simple string concatenation may be performed, as well as search based concatenation such as thesaurus based concatenation of root terms to other terms having similar meanings and the like. Accordingly, the present invention facilitates the generation of available registerable/transferable names not by simply concatenating terms entered by a user, but by concatenating a user's terms with other terms pre-stored within other data bases such as thesauruses, tables, and any other data structure containing additional terms for use in concatenation. And such concatenation may involve characters such as hyphens, and any other domain permitted strings and characters. The programming necessary to accomplish string concatenation, database lookups, etc. will be readily understood by those skilled in the art; for example, PERL (e.g., V 5.003, etc.) scripts may be used to produce string concatenations as well as to perform database dips, etc.

It is important to note that the adjunct terms may be stored locally by facility 108 (FIG. 1) or remotely in any form of data structure and/or system that supports messaging to drive database queries and the like.

Next, a looping structure is started based upon the number of terms specified in an adjunct term data base, or the number of concatenated candidate domain names. In particular, at step S3-6, each candidate domain name on a generated list is compared against internal domain name list. For example, if ten relevant adjunct terms are specified in a table driven database, ten or some other number of concatenations may have taken place so that the list of candidate domain names contains ten or some other number of entries.

Next, at step S3-7, a comparison is made to determine whether or not a match for the particular candidate domain name currently being looped upon matches any name on an internal list (e.g., database table stored in memory, disk, etc.). If not, processing proceeds to step S3-9. Otherwise processing proceeds to step S3-8 where the current candidate domain name is determined to be not available for registration and processing will loop back to step S3-6.

At step S3-9, a domain name system (DNS) lookup will be done to determine if the candidate domain currently being looped upon already exist in a root zone file such as one maintained by InterNIC root zone files 112 (FIG. 1).

Next, at step S3-10, a match determination is carried out to determine if the DNS lookup produced a match between the current candidate domain name and other domain names already in use. If such a match does not exist, processing will proceed at the top of FIG. 3C and in particular at step S3-11 thereof.

If a match does occur, processing will loop back to step S3-8 as discussed above and ultimately back to step S3-6 for evaluation of the next candidate domain name built as a result of concatenation as discussed above.

It should be noted that the present invention permits and certainly contemplates inclusion of brokerage type services in the search process associated with producing a list of available domain names. That is, the present invention contemplates querying databases of names which match generated concatenations and which may already be registered but which are currently For-Sale-By-Owner by a domain name sales (e.g., brokerage) facility. Accordingly, the present invention and, in particular, any web site that incorporates the same may be linked to other brokerage type web sites (sites selling already registered domain names) to allow appropriate database (domain name) list queries to take place. Such brokerage type queries may be carried out during any part of the process in which registerability and/or transferability is being determined in accordance with the present invention. The database queries and dips necessary to perform such brokerage type queries will be immediately understood after reviewing this patent document.

At step S3-11, a WHOIS type or similar query is automatically spawned against InterNIC files and/or other databases (e.g., databases maintained by InterNIC or other similar database authority) based on the current candidate domain being looped upon. WHOIS type queries will be immediately understood by those skilled in the art.

Next, at step S3-12, a determination will be made as to whether the WHOIS or other similar query results in an "available" determination. If the candidate name currently being looped upon is available for registration (i.e., is registerable), processing proceeds to step S3-13; if not processing loops back to step S3-8 as discussed above and ultimately to step S3-6 for the next candidate domain name.

Accordingly at step S3-13, the candidate domain name will be written to an output or "available for registration/transfer" file or log.

Next, at step S3-14, a determination will be made as to whether all available candidate domain names have been processed. If that determination is affirmative, processing proceeds at the top of FIG. 3D; if not, processing loops back to step S3-8 as discussed above and ultimately back to step S3-6.

At step S3-15, an electronic mail (e-mail) message containing all available candidate domain names, if any are found in the output file will be automatically generated and sent to the user via the Internet. Such messaging techniques will be immediately understood by those skilled in the art.

Processing ends at step S3-16.

Referring now to FIG. 4, depicted therein is a flowchart that illustrates a process where a user can access an electronic mail messaging service and receive e-mail messages from a domain name registration/transfer service. In particular, processing starts at step S4-1 and immediately proceeds to step S4-2.

At step S4-2, a user accesses an e-mail messaging service such as one provided by an Internet Service Provider (ISP), telecommunications provider, web e-mail service provider, etc. and retrieves an e-mail message from a domain name generation, registration, and transfer service such as domain name generation and registration service and system 108 (FIG. 1).

Next, at step S4-3, the user accesses the web site referenced in an e-mail as containing a list of zero or more potentially available domain name candidates which have been generated in accordance with the user's earlier specified root search terms.

Next, at step S4-4, the user is presented with registration and purchase options relative to a list of available domain name candidates provided in accordance the preferred embodiment of the present invention.

Next, at step S4-5, a user may engage in online purchase transactions to purchase and/or register available domain name candidates. Such e-commerce transactions are well known and will be immediately understood by those skilled in the art.

Processing ends as step S4-5.

The process steps described with regard to FIGS. 3A, 3B, 3C, 3D and 4, are now further illustrated with reference to FIGS. 5A, 5B, 5C, and 5D to which reference is now made.

Figure 5A:
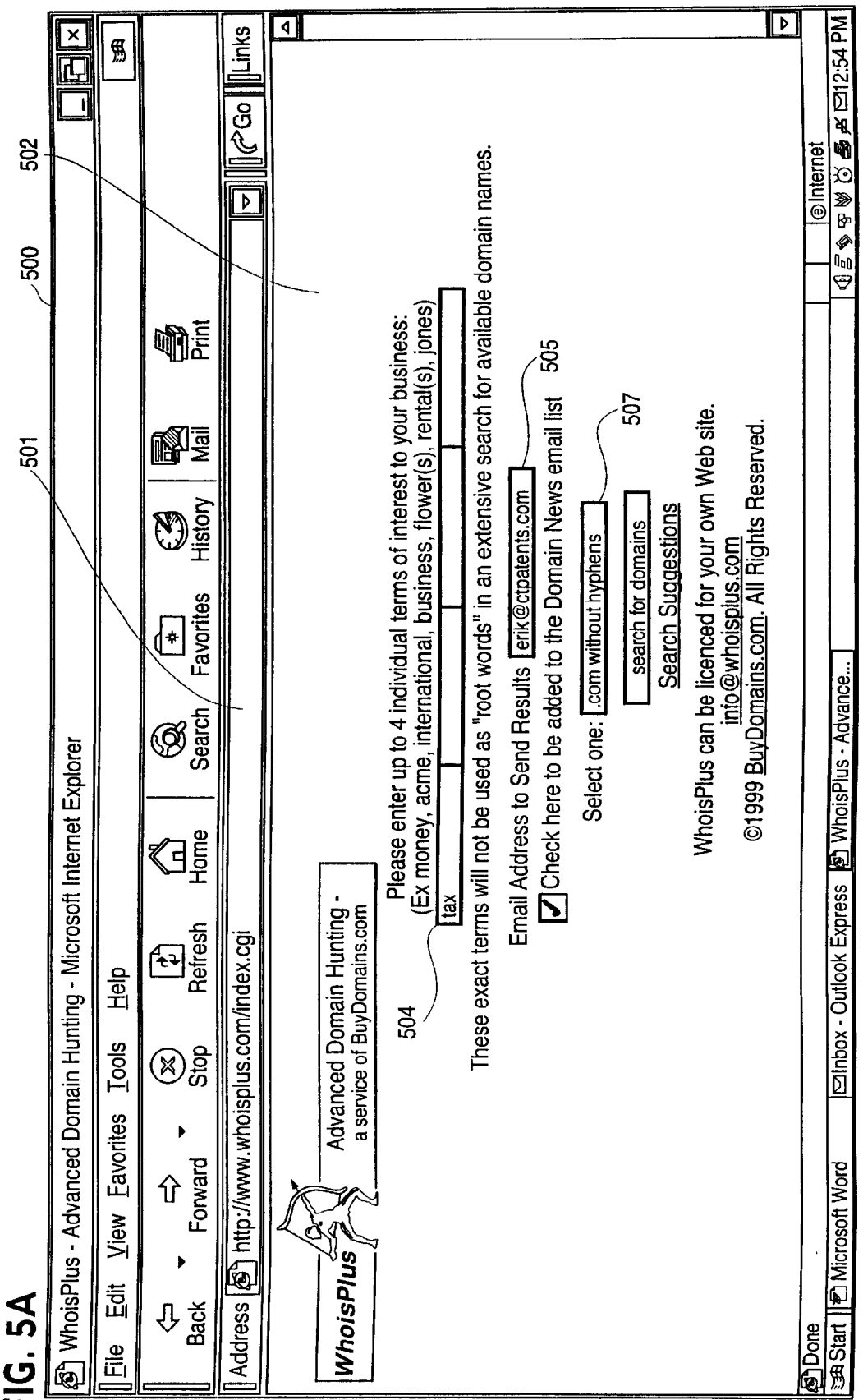
FIG. 5A is a screen shot of an exemplary WWW site that permits generation and registration/transfer of available domain names in accordance with the present invention.

Referring now to FIG. 5A, depicted therein is a screen shot of a WWW site view provided within a WWW browser client (e.g., MICROSOFT INTERNET EXPLORER V.5.0) running within a personal data processing system such as personal computer or user system 102 (FIG. 1). In particular, screen shot 500 shows an accessed web site (i.e., a domain name generation and registration service and system) having the domain name (uniform resource locator—URL) www-.whoisplus.com which is noted at address space 501. The content received from the domain name service and system is provided in browser content manifestation window 502. Content manifestation window 502 shows a web site view whereby a user may enter search terms (root terms) 504 into an online form which the present invention uses to search for available domain names and to generate candidate domain names. Additionally, the user may enter an e-mail at which he would like to receive search results e-mail correspondence from the domain name service and system. The user also may select, at pull down box 503, the types of domain name formats that may be available. For example a user may want the term "tax" to appear with other terms separated by hyphens (e.g., "tax-money.com") or otherwise and, the user may select a top level domain such as ".com" or other top level domains. Although screen shot 500 show only four (4) entry fields for search terms (terms to be concatenated with other pre-established terms, etc.), the present invention is not so limited; to the contrary, any number of root terms could be permitted as a matter of design choice.

MICROSOFT and INTERNET EXPLORER are trademarks and/or registered trademarks of MICROSOFT CORPORATION. WHOISPLUS is a trademark and/or registered trademark of RAREDOMAINS.COM, LLC.

Figure 5B:
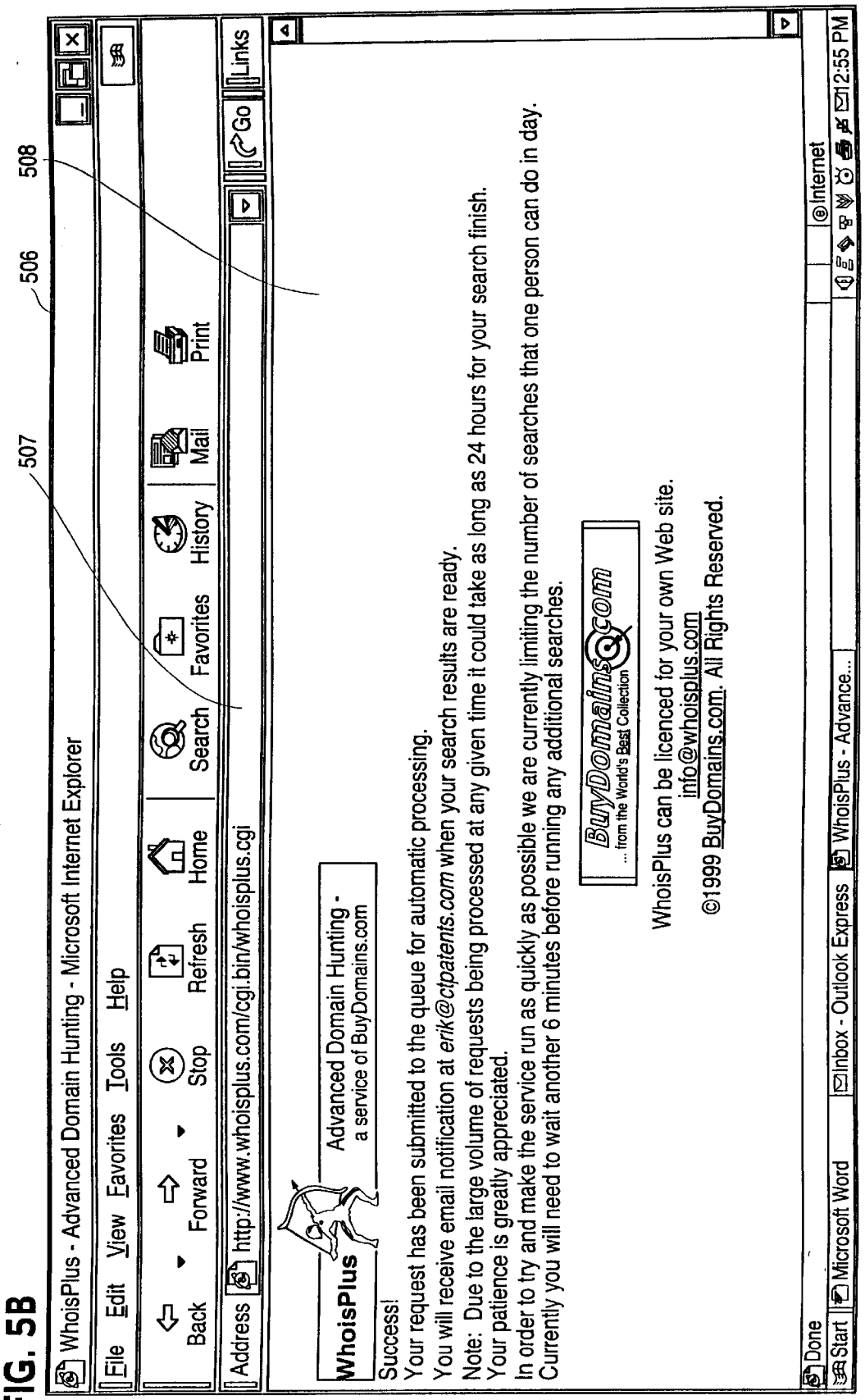
FIG. 5B is a screen shot of a daughter page accessed via the WWW shown in FIG. 5A.

Referring now to FIG. 5B, depicted therein is a supplemental web site view 506. Web site view 506 is one of a web page that indicates that the user's search terms 504 as illustrated in FIG. 5A have been processed to result in a set of available (registerable, transferable, alienable, etc.) domain names. A web site address is maintained at address section 507 and the content of the web site is maintained within web site view 508.

Referring now to FIG. 5C, depicted therein is an e-mail message 510 received from the domain name registration service via the Internet. Of course, other electronic messaging systems could be used such as receipt on personal communications devices (e.g., cellular telephones, pagers, personal digital assistants, etc.).

Figure 5D:
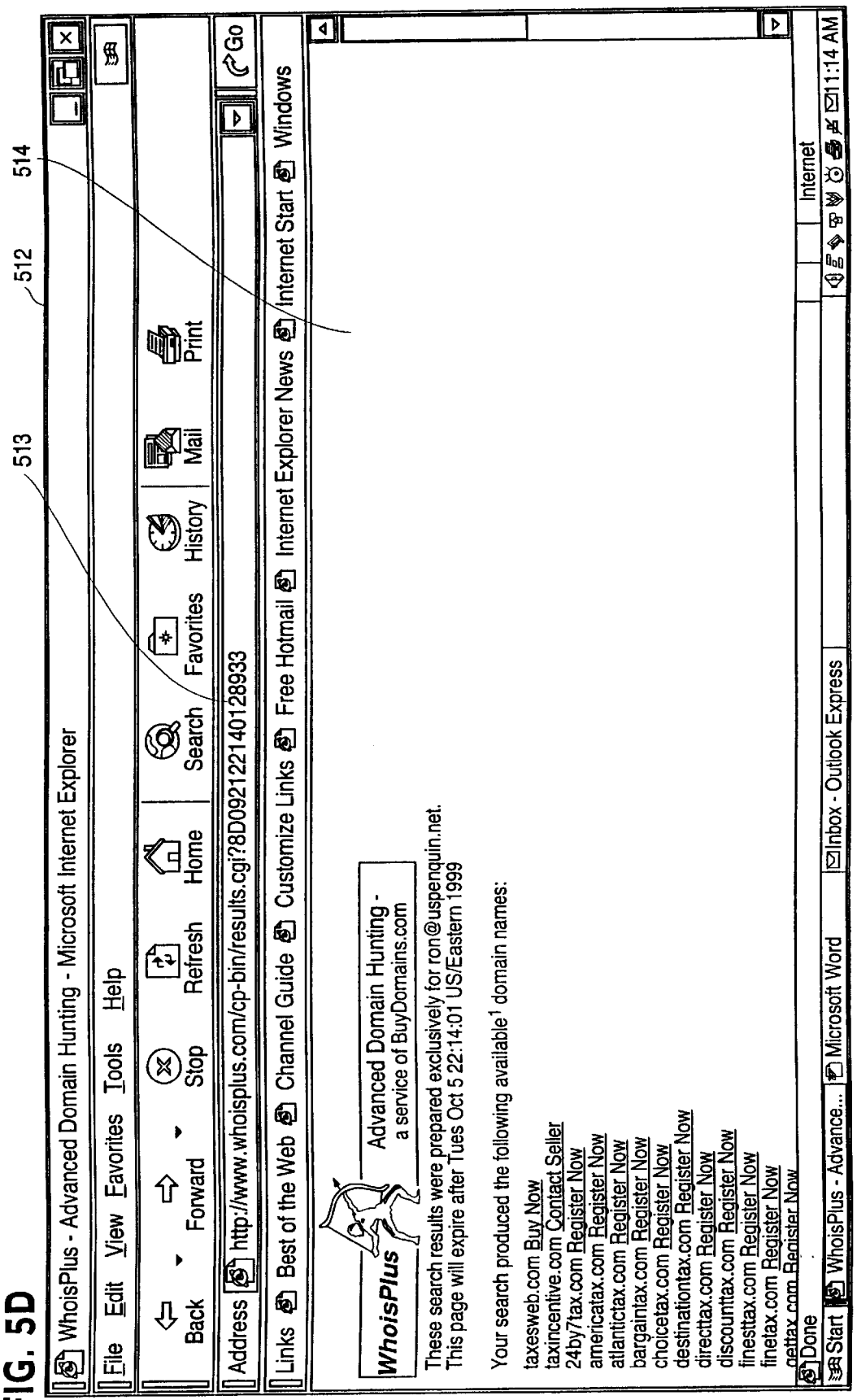
FIG. 5D is a screen shot of a WWW site that contains a list of available domain names generated in accordance with the present invention.

Referring now to FIG. 5D, depicted therein is a web site view corresponding to the e-mail message depicted in FIG. 5C. That is, web site view 512 as addressed at address section 513 (as noted in the e-mail message noted in FIG. 5C) includes content 514 that lists available domain names which have been generated by a domain name service and system such as a domain name generation system 108 (FIG. 1). As noted above with regard to FIG. 4, the user may select a hypertext link to register, purchase, lease, contact and owner, contact a brokerage, etc. in relation to one or more particular domain names immediately from web content 514.

The list of available domain names need not be viewed as a web page. Instead, the list of available domain names may come in the form a message sent via any modern communications medium (e-mail, etc.).

In the preceding discussion, registration of available domain names has been mentioned as an option related to an available domain name generated in accordance with the present invention. The present invention is not so limited. To the contrary, references to registration should also be interpreted to mean that an available domain name generated in accordance with the present invention may be registered (e.g., such as via a domain name registration authority), sold such as via a brokerage or other similar domain name sales agent, or otherwise transferred or alienated.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A system for generating a domain name and for facilitating registration of the same, comprising:

a data storage facility storing at least one adjunct term; and a processor arrangement coupled to said data storage facility and configured to be accessed by a user system via an electronic data network, to receive at least one root term from said user system, to concatenate said at least one root term with said at least one adjunct term stored by said data storage facility to generate at least one candidate second-level domain name, to query a data source to determine if said at least one candidate high level domain name is available for registration, to notify said user system of said at least one candidate second-level domain name when said at least one candidate second-level domain name is available for registration, and to permit said user system to engage in an electronic commerce transaction related to said at least one candidate second-level domain name when said at least one candidate second-level domain name is available for registration.

2. The system according to claim 1, wherein said electronic commerce transaction is an online web-enabled electronic commerce transaction.

3. A method for generating a domain name and for facilitating registration of the same, comprising the steps of:

storing a plurality of adjunct terms for use in generating an available domain name;

permitting a user to access a server facility via an electronic data network;

receiving a root term from said user via said electronic data network;

retrieving from storage an adjunct term;

concatenating said adjunct term with said root term and a top level domain identifier to generate a candidate domain name;

querying a data source to determine if said candidate domain name is available for registration; notifying said user of said candidate domain name when said candidate domain name is available for registration; and permitting said user to engage in an online electronic commerce transaction related to use of said candidate domain name when said candidate domain name is available for registration.

4. A system for generating a domain name and for facilitating registration of the same, comprising:

a storage facility storing a plurality of adjunct terms for use in generating an available domain name; and a server facility coupled to said storage facility and configured to be accessed by a user system via an electronic data network, to receive a root word from said user system via said electronic data network, to retrieve an adjunct term from said storage facility, to concatenate said root word with said adjunct term and with a top level domain to generate a candidate domain name, to query a data source to determine if said candidate domain name is available for registration, to notify said user system of said candidate domain name when said candidate domain name is available for registration, and to permit a user at said user system to engage in an electronic commerce transaction related to said candidate domain name when said candidate domain name is available for registration.

\* \* \* \* \*